Feb. 26, 1935.  J. DZIEDZIC  1,992,362
AUTOMOBILE SIGNALING APPARATUS
Filed Nov. 14, 1933   4 Sheets-Sheet 1
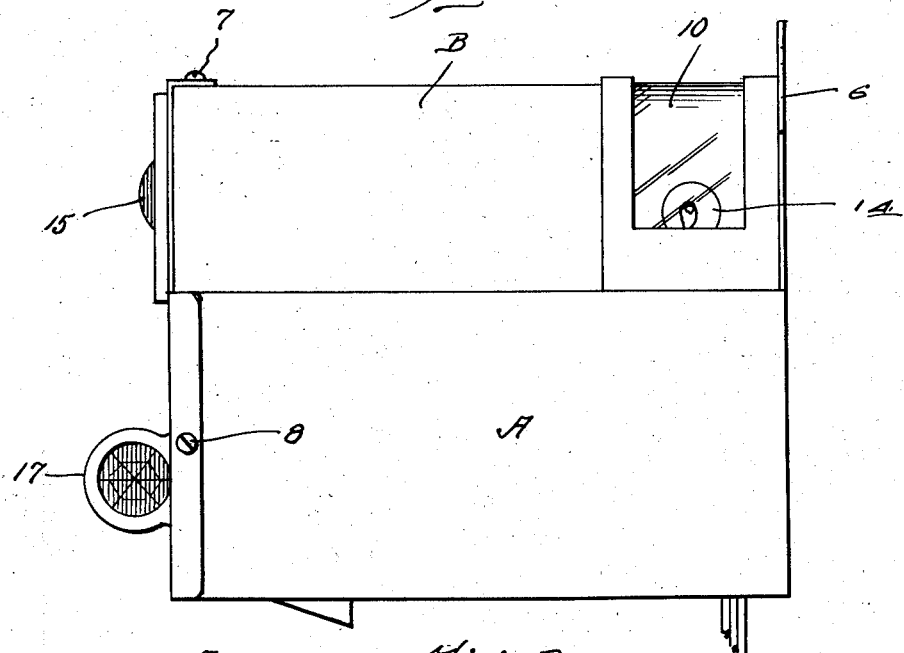
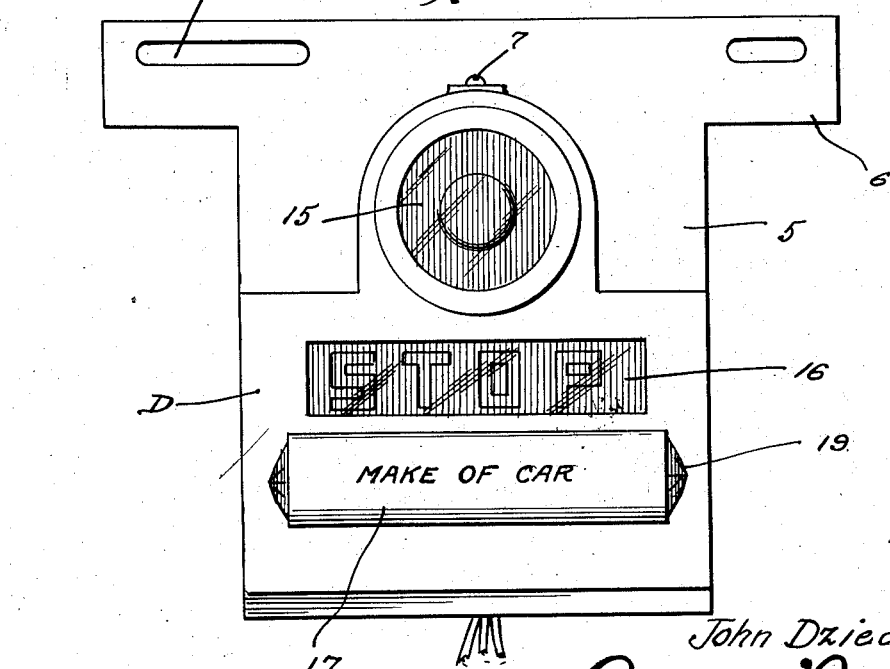
Inventor
John Dziedzic
By Clarence A. O'Brien
Attorney Feb. 26, 1935.  J. DZIEDZIC  1,992,362
AUTOMOBILE SIGNALING APPARATUS
Filed Nov. 14, 1933  4 Sheets-Sheet 2
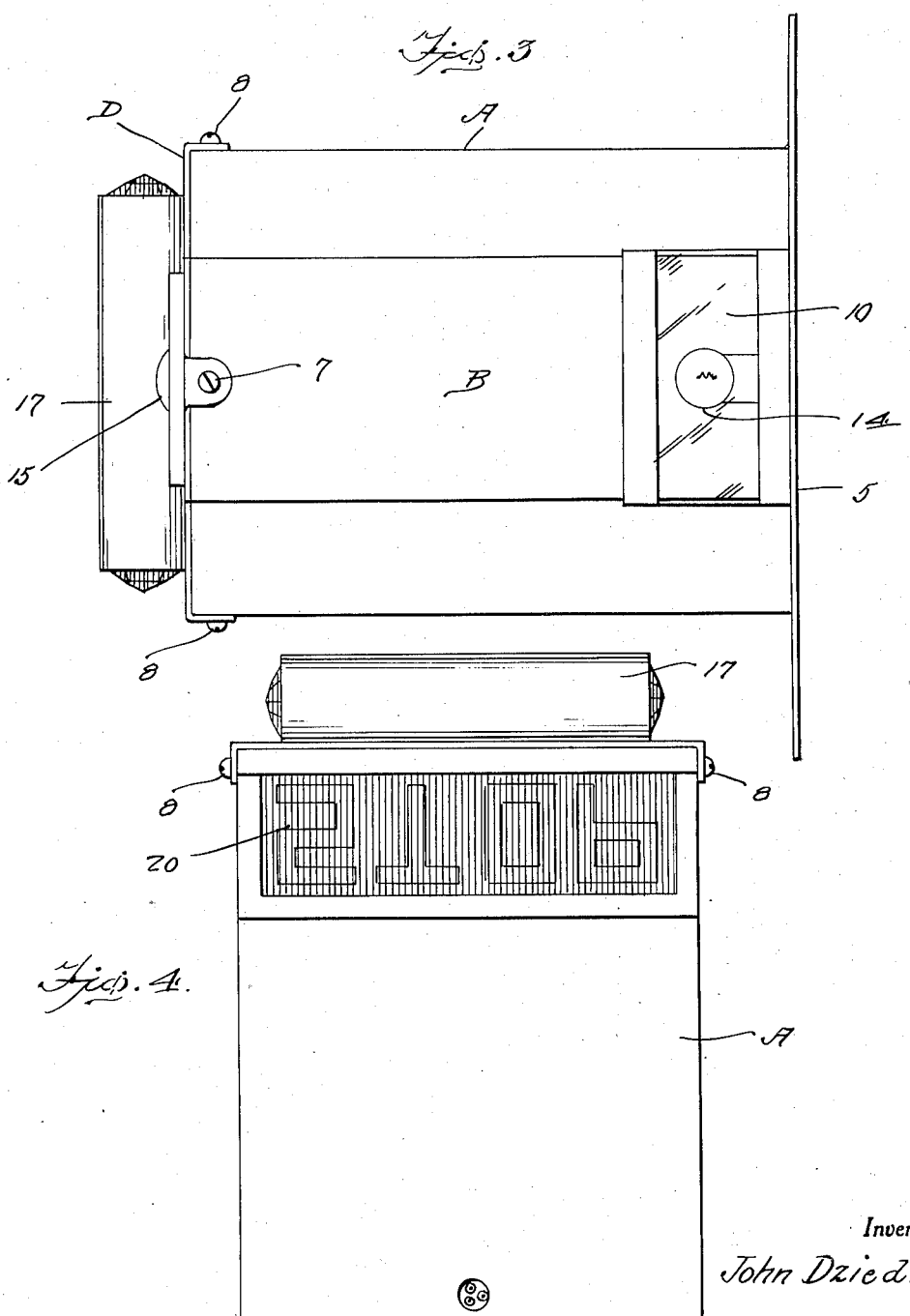
Inventor
John Dziedzic
By Clarence A. O'Brien
Attorney

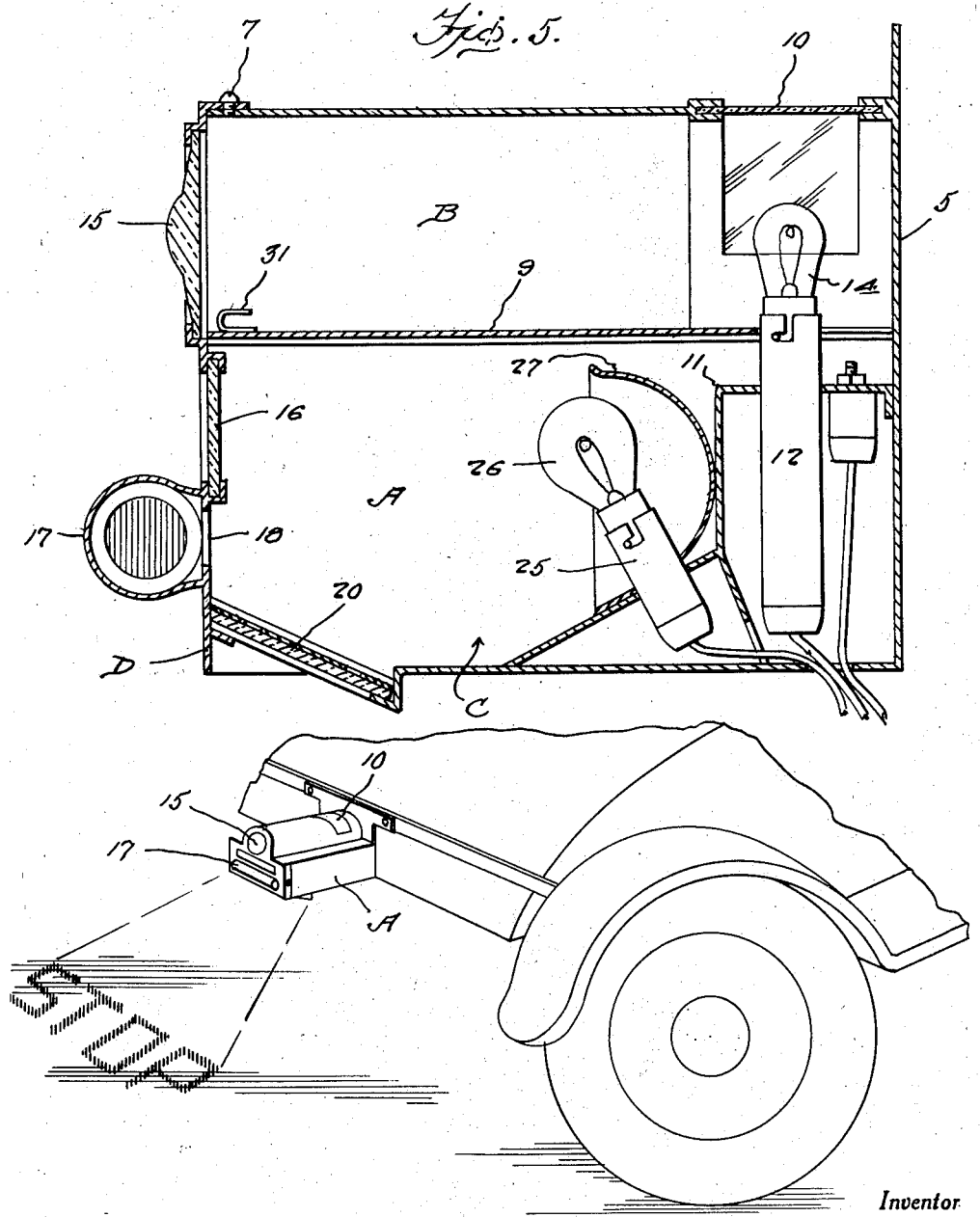

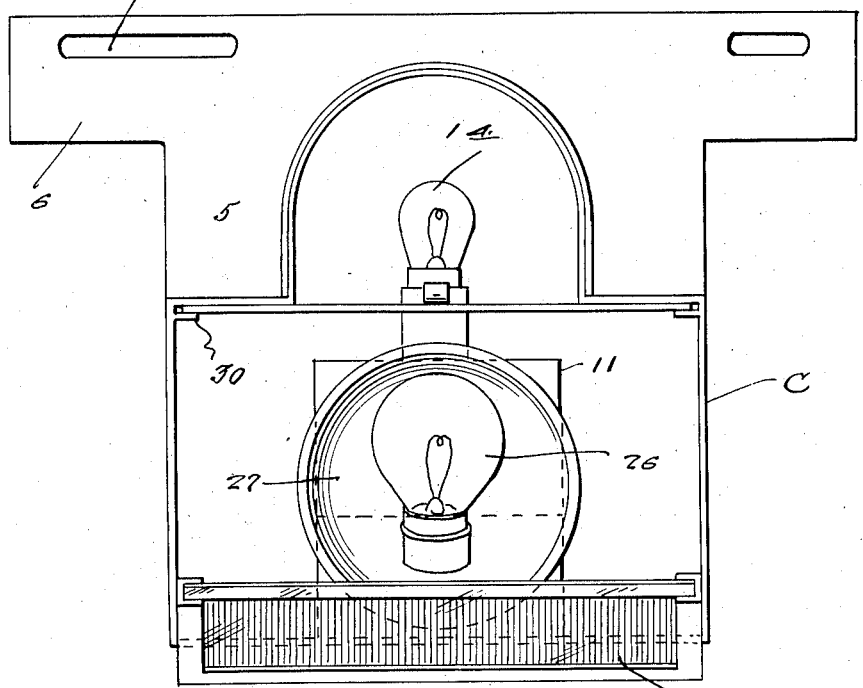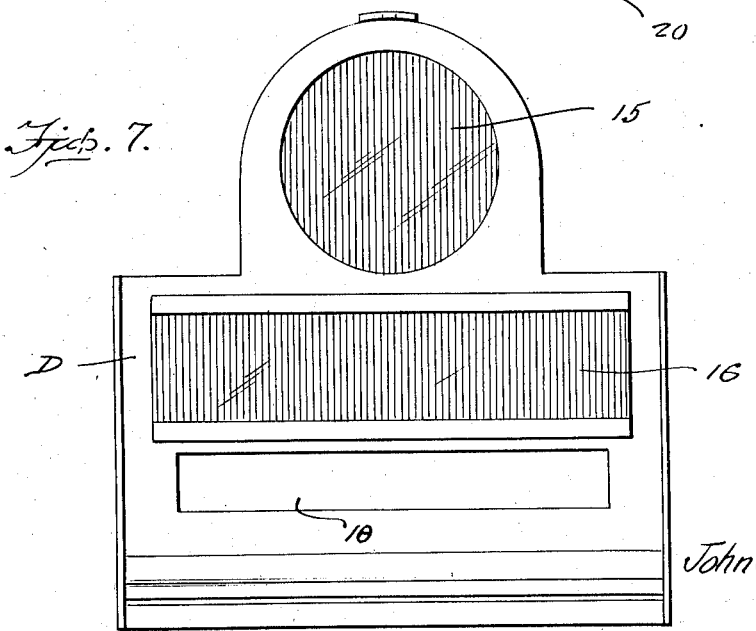

Patented Feb. 26, 1935

1,992,362

UNITED STATES PATENT OFFICE 1,992,362

AUTOMOBILE SIGNALING APPARATUS

John Dziedzic, Nanticoke, Pa.

Application November 14, 1933, Serial No. 697,991

1 Claim. (Cl. 177—329)

The present invention relates to signal means, more particularly of the type used on automobiles.

It may be noted that in common practice, the stop light, the tail light, and the rear licence illuminating light, are associated in close proximity to each other, frequently in a single casing usually mounted on the left rear fender or in the middle of the spare tire or tire carrier. In this practice, it is frequently difficult, if not impossible, in traffic conditions to satisfactorily distinguish or discriminate the stop light from the other lights unless the signals are viewed from very close proximity of the automobile and even then, the constant attention of the driver is required to distinguish one from the other.

It is an important object of the invention to effectively emphasize the stop signal by projecting the same on the street, roadway or the like on which the automobile may be travelling by projecting the word "Stop" directly on the street or the like when the brake of the automobile is applied.

Another very important object of the invention resides in the provision of an apparatus of this nature which is simple in its construction, compact in its arrangement of parts, inexpensive to manufacture, strong and durable, thoroughly efficient and reliable in use and operation, and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a side elevation of the apparatus embodying the features of my invention.

Figure 2 is a rear elevation thereof.

Figure 3 is a top plan view thereof.

Figure 4 is a bottom plan view thereof.

Figure 5 is a vertical longitudinal section therethrough.

Figure 6 is a rear elevation thereof with the rear plate removed.

Figure 7 is an elevation showing the inner side of the rear plate.

Figure 8 is a fragmentary perspective view of the rear end of an automobile showing the apparatus mounted in place for use.

Referring to the drawings in detail it will be seen that the numeral 5 denotes a forward plate the upper portion of which is provided with outwardly directed wings 6 and in the upper portion of the plate and the upper portions of the wings 6 are slots 7 so that this plate may be conveniently bolted to the rear of an automobile in any suitable manner such as shown by way of exemplification in Figure 8. A casing projects rearwardly from the plate 5 and is denoted generally by the letter C. This casing C includes a lower compartment A and an upper compartment B. Letter D denotes the rear plate which is detachable being suitably held in place by screws 7 and 8 or the like.

Numeral 9 denotes the partition between the compartments A and B. The upper wall of the compartment B is rounded and the forward portion thereof has incorporated therein a transparent panel 10. Numeral 11 denotes an auxiliary casing located in the forward portion of the compartment A. A socket 12 is mounted in this auxiliary casing 11 and extends up through the compartment 9 so that a bulb 14 in the upper end thereof cooperates with the transparent panel 10 for illuminating the rear license tag. A transparent panel 15 is mounted in the rear plate D to register with the rear end of the compartment B to function as a tail light as the bulb 14 is constantly illuminated in the night time.

A transparent panel 16 is mounted in the plate D in the upper portion of the lower section thereof and has the word "Stop" incorporated therein. A cylindrical like casing extension 17 is formed on the plate D in communication with an opening 18 therein and in the ends of this casing are transparent eye like panels 19.

In the bottom of the compartment A at the rear end portion thereof, there is mounted a transparent panel 20 having the word "Stop" incorporated therein in an inverted manner so that when the compartment A is illuminated said word will be projected onto the street, roadway or the like as shown in Figure 8. This transparent panel 20 is disposed in an upwardly and rearwardly inclined position as best shown in Figure 5.

A socket 25 is mounted in the auxiliary casing 11 and in this socket is a bulb 26 properly located with respect to a reflector 27. This bulb 26 is energized when the brake is applied. No attempt has been made to illustrate the very well known switch mechanism for energizing of a light of this nature. Now when the bulb 26 is energized the word "Stop" may be read on the transparent panel 16, the eye panels 19 will be visible and the word "Stop" will be projected from the panel 20 on to the roadway or the like.

The partition 9 is slidably mounted in suitable slideways 30 as best shown in Figure 6 so that when the plate D is removed this partition 9 may be removed thereby making all parts of the apparatus readily accessible. A handle 31 is provided on the partition 9 for manipulation thereof.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A signal device of the class described comprising a casing including a bottom wall and a rear end wall, said rear wall having a stop signal window therein spaced from the lower end of said rear wall, the bottom wall terminating a distance from the rear wall to provide an opening, a vertically arranged depending part connected with the rear end of the bottom wall, an upwardly and rearwardly sloping part connecting the lower edge of said depending part with the rear wall a distance above the lower end of said rear wall, said sloping part having an opening therein, a transparent member supported on the sloping part and bearing against the rear wall and the depending part, a plate resting on the transparent member and having the word "Stop" formed therein in inverted order, a lamp in the casing and a reflector behind said lamp and projecting light rays through the first mentioned window and said transparent member to project the word on the plate upon the road surface.

JOHN DZIEDZIC.